(12) United States Patent
Liu et al.

(10) Patent No.: US 10,270,662 B2
(45) Date of Patent: Apr. 23, 2019

(54) LOCAL CONSUMPTION OF REMOTE SERVICES

(71) Applicant: International Business Machines Corporation, Armonk, NY (US)

(72) Inventors: Ying Liu, Beijing (CN); Yan Shi, Beijing (CN); Jia Zou, Beijing (CN); Xiu Lei Zhu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 213 days.

(21) Appl. No.: 15/069,422

(22) Filed: Mar. 14, 2016

(65) Prior Publication Data

US 2017/0264495 A1  Sep. 14, 2017

(51) Int. Cl.
*H04L 29/06* (2006.01)
*H04L 12/24* (2006.01)
*H04L 12/46* (2006.01)
*H04L 29/08* (2006.01)

(52) U.S. Cl.
CPC .......... *H04L 41/12* (2013.01); *H04L 12/4633* (2013.01); *H04L 12/4641* (2013.01); *H04L 63/029* (2013.01); *H04L 63/10* (2013.01); *H04L 67/1095* (2013.01)

(58) Field of Classification Search
CPC ....................................................... H04L 65/60
See application file for complete search history.

(56) References Cited

U.S. PATENT DOCUMENTS

| 8,782,637 | B2 * | 7/2014 | Khalid | G06F 8/61 718/1 |
| 9,058,229 | B2 | 6/2015 | Locker et al. | |
| 2013/0218837 | A1 * | 8/2013 | Bhatnagar | G06F 17/30174 707/624 |
| 2013/0326487 | A1 | 12/2013 | Yousouf et al. | |
| 2015/0067642 | A1 | 3/2015 | Chen et al. | |

OTHER PUBLICATIONS

Disclosed Anonomously et al., "Local Cloud Application Shadowing", An IP.com Prior Art Database Technical Disclosure, IP.com No. 000225380, published Feb. 12, 2013, 3 pages.
IBM, "Cloud Integration—IBM Bluemix", IBM Developerworks, published Jul. 8, 2015, <https://console.ng.bluemix.net/catalogiservices/cloud-integration>, 1 page.
Mell et al., "The NIST Definition of Cloud Computing", NIST, National Institute of Standards and Technology, U.S. Department of Commerce, Special Publication 800-145, Sep. 2011, 7 pages.

* cited by examiner

*Primary Examiner* — Adnan M Mirza
(74) *Attorney, Agent, or Firm* — Gilbert Harmon, Jr.

(57) ABSTRACT

An approach for providing simulated remote services locally. A local virtual access module collects remote services for local virtual service access. Service information associated with the remote services is collected to create local service packages. A network tunnel is created on firewalls where the remote services are accessible by associated local service packages. Local environment variables are created to establish local virtual service access and the local virtual service access module simulates cloud service access outside a cloud environment.

20 Claims, 6 Drawing Sheets

LOCAL CONSUMPTION OF REMOTE SERVICES

BACKGROUND OF THE INVENTION

The present invention relates generally to developing, testing and deploying cloud applications and more particularly to consuming a cloud service when an on-demand cloud application is not deployed on a cloud.

During cloud application development, an application can be created and compiled using tools such as, but not limited to, an integrated development environment (IDE). An IDE can consist of source code editor(s), build automation tools and debugger. Cloud application development can be a demanding process as cloud services are important to the function of a cloud application. Cloud services can provide foundational and complementary function to cloud applications within in a cloud environment. Cloud services are architected to operate in a cloud environment and are generally not directly visible and/or accessible outside the cloud environment due to factors such as, but not limited to, security and access policies. To manage the life cycle of cloud applications, a Software Developer can perform an installation and configuration of cloud services in a local environment, creating local and stand-alone cloud services from a "real" cloud environment. When "local" stand-alone copies of the cloud services are established in a plurality of local environments, application development, testing and debugging can be performed with a risk that the local service does not operate exactly as "real" cloud service.

SUMMARY

As disclosed herein, a method for providing simulated remote services locally, the method comprising: collecting, by one or more local virtual access modules, one or more remote services for local virtual service access; collecting, by the one or more local virtual access modules, one or more service information associated with the one or more remote services; creating, by the one or more local virtual access modules, one or more local service packages; creating, by the one or more local virtual access modules, a network tunnel on one or more firewalls wherein the one or more remote services are accessible by the one or more local service packages, respectively; creating, by the one or more local virtual access modules, one or more local environment variables wherein the one or more local environment variables are configured to provide the local virtual service access and simulating, by the one or more local virtual access modules, the one or more remote services based on the local virtual service access. A computer system and a computer program product corresponding to the above method are also disclosed herein.

DETAILED DESCRIPTION

Aspects of the present disclosure and certain features, advantages and details thereof, are explained more fully below with reference to the non-limiting examples illustrated in the accompanying figures. Descriptions of well-known materials, fabrication tools, processing techniques, etc., are omitted to avoid obscuring the disclosure with unnecessary detail. It should be understood, however, that the detailed description and the specific examples, while indicating aspects of the invention, are given by way of illustration only and not by way of limitation. Various substitutions, modifications, additions and/or arrangements, within the spirit and/or scope of the underlying inventive concepts will be apparent to those skilled in the art from this disclosure.

Embodiments of the present invention provide systems, methods and computer program products for consuming cloud services when an on-demand cloud application is not deployed on a cloud during cloud application development phases such as, but not limited to, development, test and deployment.

Embodiments of the present invention can create and make available local cloud service package(s) based on service(s) in a cloud environment for simulated cloud operation in a local environment. The local cloud service package contains all the needed information of a cloud service. A local application can be launched and managed with an IDE and the cloud service package can be connected on the local environment. The local cloud service package acts virtually like there is a cloud environment comprising all the needed information in a local environment.

Other embodiments of the present invention provides added off-line operation of the local virtual cloud environment. In this embodiment of the present invention, service operational transactions can be recorded and stored locally. The recorded transactions can be used to synchronize the cloud environment based on events such as, but not limited to, user selection and predetermined preference settings.

Embodiments of the present invention will now be described in detail with reference to the figures. It should be noted that references in the specification to "an exemplary embodiment," "other embodiments," etc., indicate that the embodiment described may include a particular feature, structure or characteristic, but every embodiment may not necessarily include the particular feature, structure or characteristic. Moreover, such phrases are not necessarily referring to the same embodiment. Further, when a particular feature, structure or characteristic is described in connection with an embodiment, it is submitted that it is within the knowledge of one skilled in the art to affect such feature, structure or characteristic in connection with other embodiments whether or not explicitly described.

Figure 1:
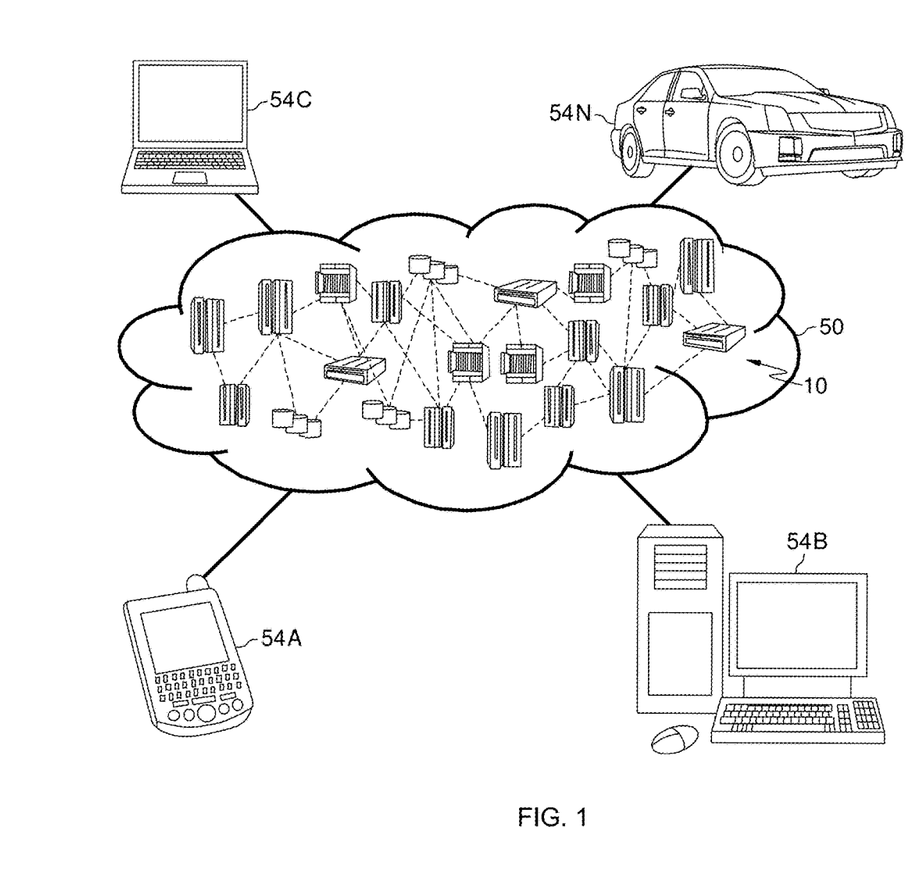
FIG. 1 depicts a cloud computing environment according to an embodiment of the present invention.

FIG. 1 depicts a cloud computing environment according to an embodiment of the present invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines and services) that can be rapidly provisioned and released with minimal management effort or interaction with a provider of the service. This cloud model may include at least five characteristics, at least three service models and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth and active user accounts). Resource usage can be monitored, controlled and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems or storage, but has control over the deployed applications and possibly application hosting environment configurations.

Infrastructure as a Service (IaaS): the capability provided to the consumer is to provision processing, storage, networks and other fundamental computing resources where the consumer is able to deploy and run arbitrary software, which can include operating systems and applications. The consumer does not manage or control the underlying cloud infrastructure but has control over operating systems, storage, deployed applications and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community or public) that remain unique entities but are bound together by standardized or proprietary technology that enables data and application portability (e.g., cloud bursting for load-balancing between clouds).

A cloud computing environment is service oriented with a focus on statelessness, low coupling, modularity and semantic interoperability. At the heart of cloud computing is an infrastructure that includes a network of interconnected nodes.

Referring to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C and/or automobile computer system 54N may communicate. Computing nodes 10 may communicate with one another. They may be grouped (not shown) physically or virtually, in one or more networks, such as Private, Community, Public or Hybrid clouds as described hereinabove or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
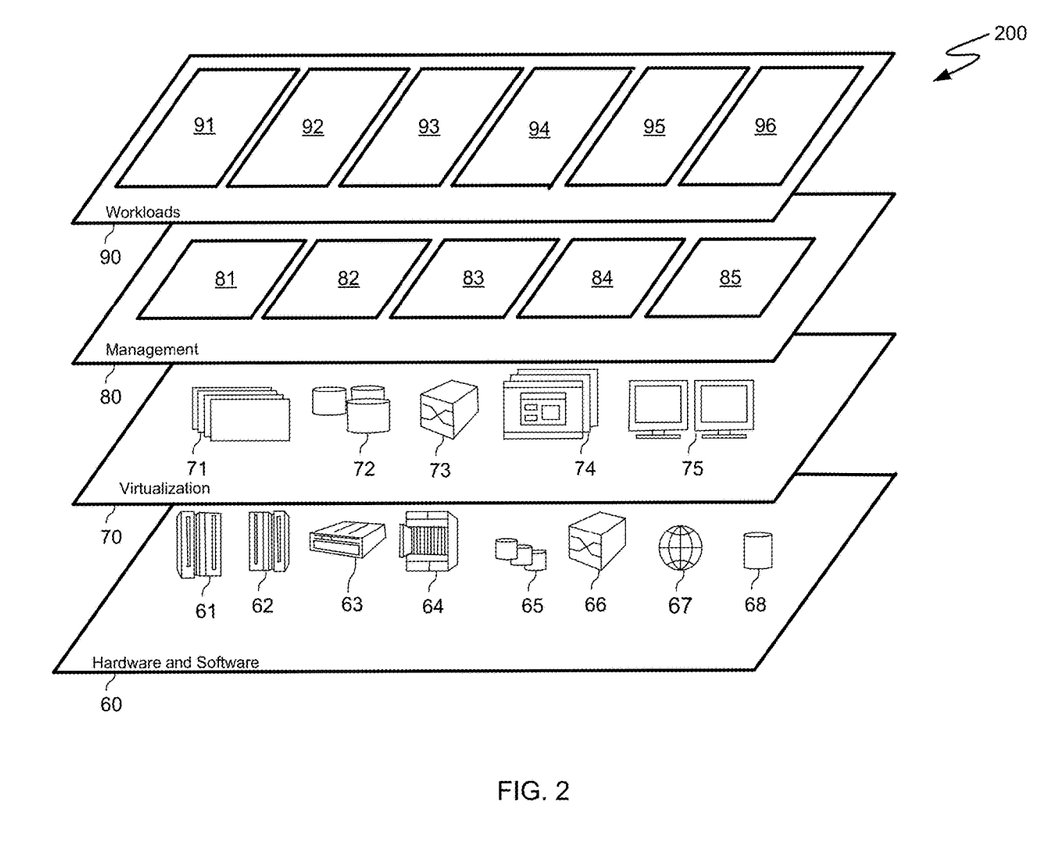
FIG. 2 depicts abstraction model layers according to an embodiment of the present invention.

FIG. 2 depicts abstraction model layers according to an embodiment of the present invention and comprises a set of functional abstraction layers provided by cloud computing environment 50 (FIG. 1). It should be understood in advance that the components, layers and functions shown in FIG. 2 are intended to be illustrative only and embodiments of the present invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85, provide pre-arrangement for and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and VIRTUAL SERVICE MODULE 96. VIRTUAL SERVICE MODULE 96 implements the functions described above for providing one or more cloud services for remote cloud service access.

Figure 3:
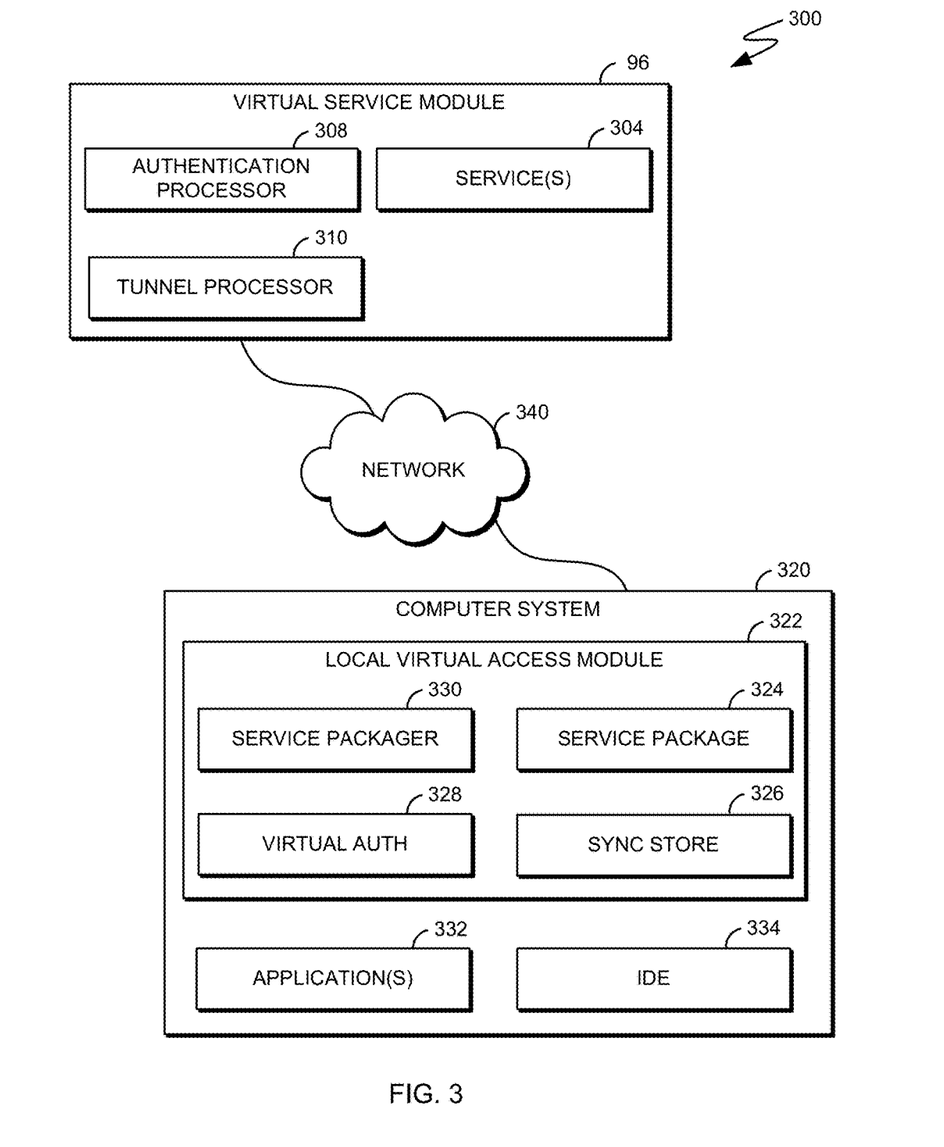
FIG. 3 depicts a functional block diagram illustrating virtual cloud service and simulated local cloud service components for service access in a local environment, in accordance with an embodiment of the present invention.

FIG. 3 depicts a functional block diagram illustrating virtual cloud service and simulated local cloud service components for service access in a local environment, in accordance with an embodiment of the present invention.

In one embodiment of the present invention, computing environment 300 comprises VIRTUAL SERVICE MODULE 96 and COMPUTER SYSTEM 320, interconnected via NETWORK 340. COMPUTER SYSTEM 320 can be desktop computers, laptop computers, specialized computer servers or the like. In certain embodiments, COMPUTER SYSTEM 320 represent computer systems utilizing clustered computers and components acting as a single pool of seamless resources via NETWORK 340. For example, such embodiments can be used in data center, cloud computing, storage area network (SAN), and network attached storage (NAS) applications. In general, COMPUTER SYSTEM 320 can be representative of any electronic devices, or combination of electronic devices, capable of executing computer readable program instructions, as described in detail with regard to FIG. 6.

In one embodiment of the present invention, VIRTUAL SERVICE MODULE 96 comprises, AUTHENTICATION PROCESSOR 308, SERVICE(S) 304 and TUNNEL PROCESSOR 310.

In one embodiment of the present invention, VIRTUAL SERVICE MODULE 96 can be a plurality of VIRTUAL SERVICE MODULES 96 within a cloud environment. VIRTUAL SERVICE MODULE 96 can provide access to cloud functions used by applications not present in a cloud environment. In embodiments of the present invention, VIRTUAL SERVICE MODULE 96 comprises any combination of commercial or custom devices and/or software products associated with enabling, operating and maintaining cloud access not on a cloud environment.

In one embodiment of the present invention, SERVICE(S) 304 can be a plurality of SERVICE(S) 304 within VIRTUAL SERVICE MODULE 96. SERVICE(S) 304 are resources that can be used by applications for actions such as, but not limited to, performing tasks and transactions. SERVICE(S) 304 can be the source from which virtual access will be based on.

In one embodiment of the present invention, AUTHENTICATION PROCESSOR 308 can be a plurality of AUTHENTICATION PROCESSORS 308 within VIRTUAL SERVICE MODULE 96. AUTHENTICATION PROCESSOR 308 comprise security and/or access rules associated with SERVICE(S) 304. In embodiments of the present invention AUTHENTICATION PROCESSOR 308 can be integrated with associated SERVICE(S) 304 and/or separate. AUTHENTICATION PROCESSOR 308 can be used as the operational access source component from which virtual service access is based.

In one embodiment of the present invention, TUNNEL PROCESSOR 310 can be a plurality of TUNNEL PROCESSORS 310 within VIRTUAL SERVICE MODULE 96 and/or COMPUTER SYSTEM 320. TUNNEL PROCESSOR 310 can be used to create firewall tunnels and/or connections to allow trusted access between VIRTUAL SERVICE MODULE 96 and LOCAL VIRTUAL ACCESS MODULE 322. In embodiments of the present invention, TUNNEL PROCESSOR 310 comprises any combination of commercial or custom devices and/or software products associated with operating and maintaining a network tunnel and can operate on VIRTUAL SERVICE MODULE 96 and/or COMPUTER SYSTEM 320.

In one embodiment of the present invention, NETWORK 340 can be, for example, a local area network (LAN), a wide area network (WAN) such as the Internet or a combination of the two and include wired, wireless or fiber optic connections. In general, NETWORK 340 can be any combination of connections and protocols that will support communications between VIRTUAL SERVICE MODULE 96 and COMPUTER SYSTEM 320, in accordance with an embodiment of the present invention. It should be noted that virtual networks 73 can comprise NETWORK 340.

In one embodiment of the present invention, COMPUTER SYSTEM 320 comprises, LOCAL VIRTUAL ACCESS MODULE 322, APPLICATION(S) 332 and IDE 334. LOCAL VIRTUAL ACCESS MODULE 322 further comprises SERVICE PACKAGE 324, SYNC STORE 326, VIRTUAL AUTH 328 and SERVICE PACKAGER 330.

In one embodiment of the present invention, LOCAL VIRTUAL ACCESS MODULE 322 can be a plurality of LOCAL VIRTUAL ACCESS MODULES 322 within COMPUTER SYSTEM 320. LOCAL VIRTUAL ACCESS MODULE 322 can create a virtual cloud service connection toward VIRTUAL SERVICE MODULE 96 to enable SERVICE(S) 304 visibility to APPLICATION(S) 332 and/or IDE 334. In embodiments of the present invention, LOCAL VIRTUAL ACCESS MODULE 322 comprises any combination of commercial or custom devices and/or software products associated with operating and maintaining local virtual cloud service access. It should be noted, in some embodiments of the present invention, components of LOCAL VIRTUAL ACCESS MODULE 322 can operate on COMPUTER SYSTEM 320 and/or VIRTUAL SERVICE MODULE 96.

In one embodiment of the present invention, SERVICE PACKAGER 330 can be a plurality of SERVICE PACKAGERS 330 within LOCAL VIRTUAL ACCESS MODULE 322. SERVICE PACKAGER 330 creates SERVICE PACKAGE 324 on COMPUTER SYSTEM 320 for local use by APPLICATION(S) 332 and/or IDE 334. In embodiments of the present invention, SERVICE PACKAGER 330 comprises any combination of commercial or custom devices and/or software products associated with creating and maintaining SERVICE PACKAGE 324. In an example of an embodiment of the present invention where components of LOCAL VIRTUAL ACCESS MODULE 322 operate on VIRTUAL SERVICE MODULE 96, SERVICE PACKAGER 330 can create and send SERVICE PACKAGE 324 toward COMPUTER SYSTEM 320.

In one embodiment of the present invention, SERVICE PACKAGE 324 can be a plurality of SERVICE PACKAGES 324 within LOCAL VIRTUAL ACCESS MODULE 322. SERVICE PACKAGE 324 can be a local representation of SERVICE(S) 304 and comprise a plurality of functions of SERVICE(S) 304 and associated authentication rules/controls of AUTHENTICATION PROCESSOR 308. In other embodiments of the present invention, SERVICE PACKAGE 324 can record synchronization (sync) information such as, but not limited to, tasks and transactions while operating in an off-line mode. Sync information can be sent toward SYNC STORE 326. In embodiments of the present invention, SERVICE PACKAGE 324 comprises any combination of commercial or custom devices and/or software products associated with simulating a virtual cloud service locally.

In one embodiment of the present invention, VIRTUAL AUTH 328 can be a plurality of VIRTUAL AUTH'S 328 within LOCAL VIRTUAL ACCESS MODULE 322. VIRTUAL AUTH 328 comprises authentication rules/controls based on AUTHENTICATION PROCESSOR 308. VIRTUAL AUTH 328 passes local authentication requests toward AUTHENTICATION PROCESSOR 308 when operating APPLICATION(S) 332 and/or IDE 334 in an on-line mode. VIRTUAL AUTH 328 processes local authentication requests similar to AUTHENTICATION PROCESSOR 308 when operating APPLICATION(S) 332 and/or IDE 334 in off-line mode.

In one embodiment of the present invention, SYNC STORE 326 can be a plurality of SYNC STORES 326 within LOCAL VIRTUAL ACCESS MODULE 322. SYNC STORE 326 can be a record of local operations performed with SERVICE PACKAGE 324 while LOCAL VIRTUAL ACCESS MODULE 322 is in off-line mode. When LOCAL VIRTUAL ACCESS MODULE 322 is in on-line mode and there are sync information in SYNC STORE 326, LOCAL VIRTUAL ACCESS MODULE 322 can send sync information toward VIRTUAL SERVICE MODULE 96 and/or SERVICE(S) 304 based on user selection and/or one or more predetermined parameter settings. It should be noted that SERVICE(S) 304 can provide read access and may not require sync however SERVICE(S) 304 can provide update function to cause sync decisions. SYNC STORE 326 can operate as a temporary store while in off-line mode and/or as a persistent log history of sync information based on an identified SERVICE PACKAGE 324.

In one embodiment of the present invention, APPLICATION(S) 332 can be a plurality of APPLICATION(S) 332 within COMPUTER SYSTEM 320. APPLICATION(S) 332 can be local applications such as, but not limited to, programs, subroutines, objects and services that consume other cloud services (SERVICE(S) 304) and/or can operate by IDE 334. APPLICATION(S) 332 comprises any combination of commercial or custom devices and/or software products.

In one embodiment of the present invention, IDE 334 can be a plurality of IDE'S 334 within COMPUTER SYSTEM 320. IDE 334 depicts a software application development environment that facilitates software development. In embodiments of the present invention, IDE 334 comprises any combination of commercial or custom devices and/or software products and can be associated to LOCAL VIRTUAL ACCESS MODULE 322 as a virtual connection to SERVICE(S) 304 to support development and testing of APPLICATION(S) 332.

Figure 4:
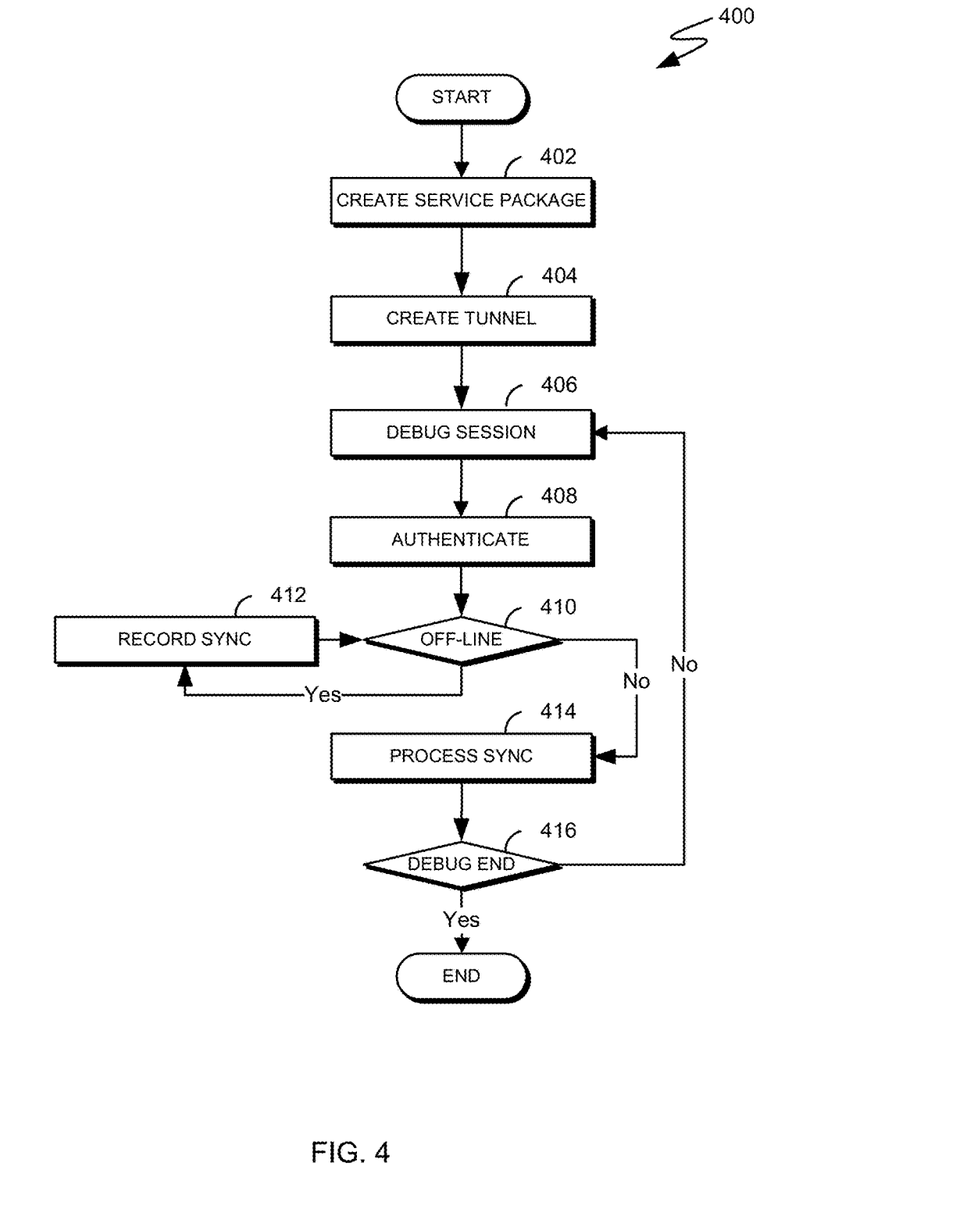
FIG. 4 is a flowchart depicting simulated local cloud service environment setup and operation, in accordance with an embodiment of the present invention.

FIG. 4 is a flowchart depicting simulated local cloud service environment setup and operation, in accordance with an embodiment of the present invention.

In step CREATE SERVICE PACKAGE 402 of flow diagram 400 simulated local cloud service flow, SERVICE PACKAGER 330 can collect the logic of SERVICE(S) 304 and associated authentication rules from AUTHENTICATION PROCESSOR 308 to create an associated SERVICE PACKAGE 324. The selection of SERVICE(S) 304 to be packaged for virtual access (e.g., simulated cloud access) can be predetermined by methods such as, but not limited to, a user selection, a predetermined list and an automated scan of APPLICATION(S) 332 code components to create a collection/list of services used. Each SERVICE PACKAGE 324 can comprise a plurality of SERVICE(S) 304 (e.g., one to many) function provided association of SERVICE PACKAGE 324 and SERVICE(S) 304 are not discernable to APPLICATION(S) 332 and/or IDE 334 operation. SERVICE PACKAGER 330 can provide a recording component for storing sync transactions while LOCAL VIRTUAL ACCESS MODULE 322 operates in off-line mode.

In step CREATE TUNNEL 404, LOCAL VIRTUAL ACCESS MODULE 322 enables/creates a network tunnel between VIRTUAL SERVICE MODULE 96 and LOCAL VIRTUAL ACCESS MODULE 322 and/or COMPUTER SYSTEM 320. The network tunnel establishes a virtual link between SERVICE(S) 304 and associated SERVICE PACKAGE 324 to make SERVICE(S) 304 visible remotely (e.g., outside of a cloud).

In step DEBUG SESSION 406, a debug session is started using a tool such as, but not limited to, IDE 334. Access information is configured to access a cloud service in a local environment. It should be noted that IDE 334 configuration can be established within IDE 334 or by other techniques such as, but not limited to, injecting environment variables in COMPUTER SYSTEM 320. At completion of step DEBUG SESSION 406, IDE 334 recognizes SERVICE PACKAGE 324 as the associated real SERVICE(S) 304.

In step AUTHENTICATE 408, APPLICATION(S) 332 can be operating by IDE 334 and/or locally to access various SERVICE(S) 304. SERVICE(S) 304 can require authentication to determine if access is permitted and what kind of access is permitted a user and/or an application has with SERVICE(S) 304. In off-line mode, SERVICE PACKAGE 324 provides simulated authentication. In on-line mode, the same authentication component of SERVICE PACKAGE 324 can be used where LOCAL VIRTUAL ACCESS MODULE 322 sends authentication information toward AUTHENTICATION PROCESSOR 308.

Step OFF-LINE 410 can be a logical option that can be enabled for purposes such as, but not limited to, isolated debugging of APPLICATION(S) 332 where, for example, a user may desire delayed, limited or no transaction information to pass to a cloud environment. Embodiments of the present invention can provide an off-line mode switch for control by a user and/or predetermined settings. Off-line mode can be a selection applied to a plurality and/or combination of SERVICE PACKAGE 324 based on implementation. When off-line mode is enabled, operation flow proceeds toward step RECORD SYNC 412, otherwise, operation flow proceeds toward step PROCESS SYNC 414.

In step RECORD SYNC 412, a recording of operating actions can be activated during off-line mode. If SERVICE PACKAGE 324 is accessed during APPLICATION(S) 332 testing, a record of actions can be sent toward SYNC STORE 326. For different SERVICE(S) 304, the data stored can vary. For example, for a database service, the data that a user inserts to the database and the associated user actions on the database service, are stored in SYNC STORE 326. In an example where the service is not a database, the recorded sync transactions would be appropriate to that service. It should be noted that some embodiments of the present invention can activate step RECORD SYNC 412 in on-line mode as a technique to record actions for activities such as, but not limited to, debug analysis.

In step PROCESS SYNC 414, if a transition from off-line mode to on-line mode event occurs, step PROCESS SYNC 414 responds that a synchronization can be performed with the connected cloud environment. From the prior SERVICE(S) 304 database service example, a user can choose to synchronize with the cloud environment and the data will be pushed to the cloud database instance operating in a similar operation that would be performed in on-line mode. Step PROCESS SYNC 414 can execute a replay of actions that were performed in the local environment in the 'real' cloud database instance to achieve a cloud service sync. It should be noted that an event such as, but not limited to, user interaction and/or decision to sync can be predetermined. It should be further noted that the authorization component can continue to operate during sync processing to identify issues with SERVICE(S) 304 that may have changed between sync operations.

In step DEBUG END 416, APPLICATION(S) 332 testing completes and LOCAL VIRTUAL ACCESS MODULE 322 responds by determining if a sync needs to be processed. If a sync is needed, a procedure similar to step PROCESS SYNC 414 is performed and LOCAL VIRTUAL ACCESS MODULE 322 sends a request toward TUNNEL PROCESSOR 310 to close the cloud environment connection.

Figure 5:
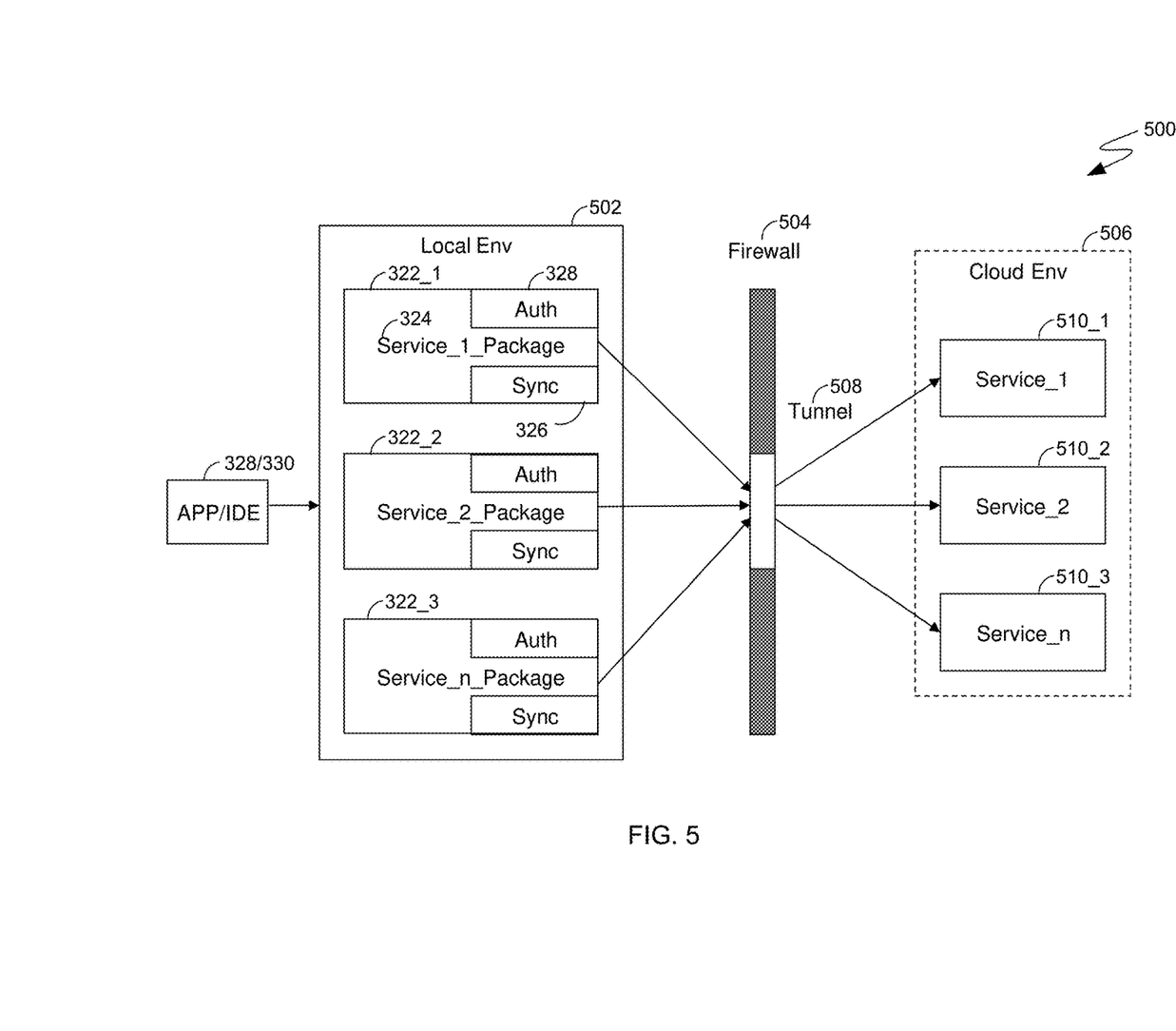
FIG. 5 depicts a sample operational model of a local cloud service enabled environment, in accordance with an embodiment of the present invention.

FIG. 5 depicts a sample operational model of a local cloud service enabled environment, in accordance with an embodiment of the present invention. Local cloud service enabled environment 500 comprises item APP/IDE 328/330, item Local Env 502, item Firewall 504, item Cloud Env 506 and item Tunnel 508.

Item Local Env 502 can be a local computing environment such as, but not limited to, COMPUTER SYSTEM 320.

Item APP/IDE 328/330 represents APPLICATION(S) 332 and/or IDE 334 used for testing an application. Item APP/IDE 328/330 can have a connection to item Local Env 502.

Item LOCAL VIRTUAL ACCESS MODULE_1 322_1, item LOCAL VIRTUAL ACCESS MODULE_2 322_2 and item LOCAL VIRTUAL ACCESS MODULE_3 322_3 can be a plurality of local virtual access modules (e.g., LOCAL VIRTUAL ACCESS MODULE 322).

Item LOCAL VIRTUAL ACCESS MODULE_1 322_1 can be one example comprising Item Service_1_Package (SERVICE PACKAGE 324) 324 further comprising Item Sync (SYNC STORE 326) 326 which can be a transaction store and item Auth (VIRTUAL AUTH 328) 328 which can be an authorization component.

Item Cloud Env 506 can be a cloud computing environment such as, but not limited to, VIRTUAL SERVICE MODULE 96.

Item Service_1 510_1, item Service_2 510_2 and item Service_n 510_3 can be a plurality of SERVICE(S) 304 associated to SERVICE PACKAGE 324 where 'n' is an identifier of any associated cloud service.

Item Firewall 504, can be a system network firewall separating cloud computing environment 50 from COMPUTER SYSTEM 320 and item Tunnel 508 can be a 'trusted' connection created through Item Firewall 504.

Item Service_1_Package (SERVICE PACKAGE 324) 324, can be a Cloud service package where main function of the service package simulates the associated cloud service SERVICE(S) 304. Item Service_1_Package (SERVICE PACKAGE 324) 324 comprises the information and configuration of which a real cloud service (SERVICE(S) 304) operates. In on-line mode, item APP/IDE 328/330 can connect to and interact with real cloud service SERVICE(S) 304 directly through item Service_1_Package (SERVICE PACKAGE 324) 324. Item Service_1_Package (SERVICE PACKAGE 324) 324 comprises item Auth (VIRTUAL AUTH 328) 328 component(s) to communication with real cloud service (SERVICE(S) 304). Item Auth (VIRTUAL AUTH 328) 328 component can be provided by the cloud environment (e.g., AUTHENTICATION PROCESSOR 308) with "injected" authentication information using techniques such as, but not limited to, authenticated Uniform Resource Locator (URL), user/password for base authorization, client id for Oauth (e.g., "Open Authentication") and logic to do authentication. It should be noted that Oauth is one example of a plurality of open source authentication standards. It should be noted that when in on-line mode, data and/or actions can be transferred to the cloud environment and sync data and/or actions are not required to be locally stored in a sync component (Item Sync (SYNC STORE 326) 326). It should be noted, whether in on-line or off-line mode, embodiments of the present invention, provide the ability for an application to consume cloud services outside of a cloud environment (e.g., local consumption of remote services).

Figure 6:
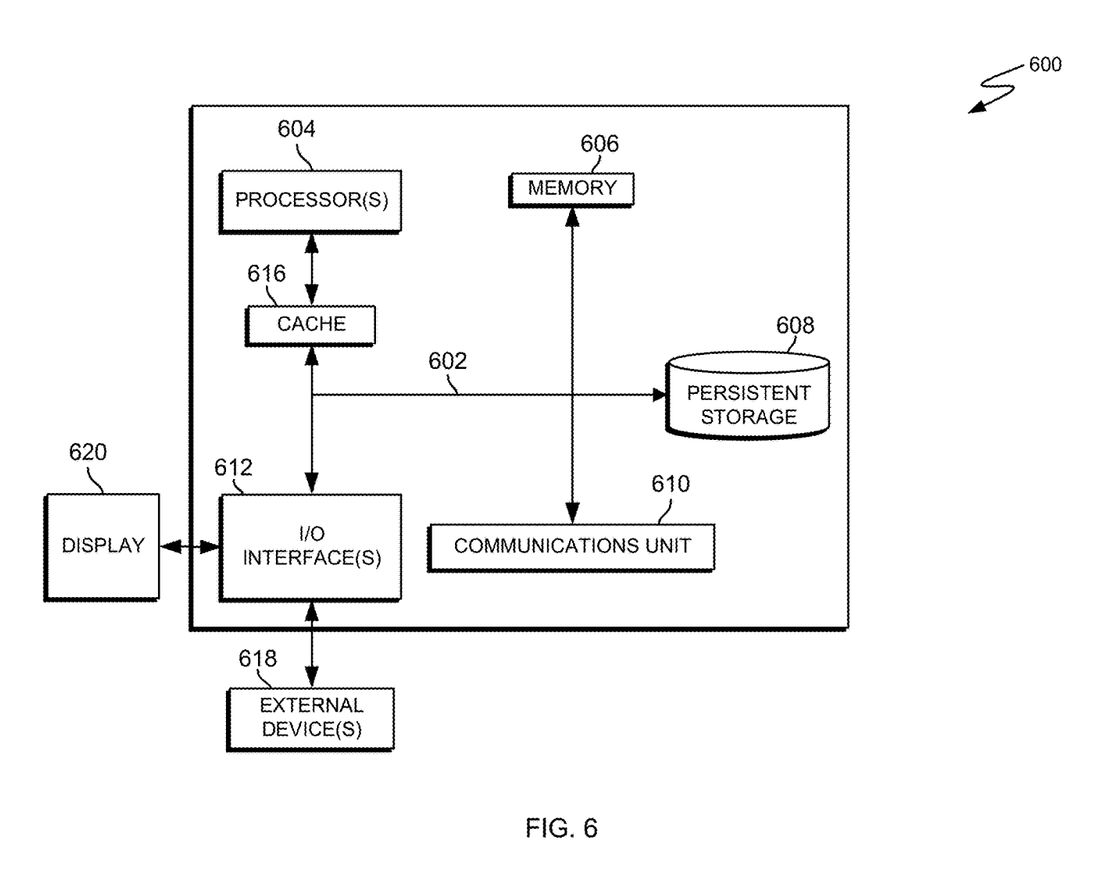
FIG. 6 depicts a block diagram of components of the server and/or the computing device, in accordance with an embodiment of the present invention.

FIG. 6 depicts a block diagram of components of the server and/or the computing device, in accordance with an illustrative embodiment of the present invention. FIG. 6 depicts components of a computing nodes 10, which may be a cloud computing node and/or COMPUTER SYSTEM 320 and by way of example, computing nodes 10 and/or COMPUTER SYSTEM 320 may generally be any of the computing devices described herein, such as network devices, client computers, server computers, etc. It should be appreciated that FIG. 6 provides only an illustration of one implementation and does not imply any limitations with regard to the environments in which different embodiments may be implemented. Many modifications to the depicted environment may be made.

Computer system 600 includes communications fabric 602, which provides communications between computer processor(s) 604, memory 606, persistent storage 608, communications unit 610 and input/output (I/O) interface(s) 612. Communications fabric 602 can be implemented with any architecture designed for passing data and/or control information between processors (such as microprocessors, communications and network processors, etc.), system memory, peripheral devices and any other hardware components within a system. For example, communications fabric 602 can be implemented with one or more buses.

Computer system 600 includes processors 604, cache 616, memory 606, persistent storage 608, communications unit

610, input/output (I/O) interface(s) 612 and communications fabric 602. Communications fabric 602 provides communications between cache 616, memory 606, persistent storage 608, communications unit 610 and input/output (I/O) interface(s) 612. Communications fabric 602 can be implemented with any architecture designed for passing data and/or control information between processors (such as microprocessors, communications and network processors, etc.), system memory, peripheral devices and any other hardware components within a system. For example, communications fabric 602 can be implemented with one or more buses or a crossbar switch.

Memory 606 and persistent storage 608 are computer readable storage media. In this embodiment, memory 606 includes random access memory (RAM). In general, memory 606 can include any suitable volatile or non-volatile computer readable storage media. Cache 616 is a fast memory that enhances the performance of processors 604 by holding recently accessed data and data near recently accessed data, from memory 606.

Program instructions and data used to practice embodiments of the present invention may be stored in persistent storage 608 and in memory 606 for execution by one or more of the respective processors 604 via cache 616. In an embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory or any other computer readable storage media that is capable of storing program instructions or digital information.

The media used by persistent storage 608 may also be removable. For example, a removable hard drive may be used for persistent storage 608. Other examples include optical and magnetic disks, thumb drives and smart cards that are inserted into a drive for transfer onto another computer readable storage medium that is also part of persistent storage 608.

Communications unit 610, in these examples, provides for communications with other data processing systems or devices. In these examples, communications unit 610 includes one or more network interface cards. Communications unit 610 may provide communications through the use of either or both physical and wireless communications links. Program instructions and data used to practice embodiments of the present invention may be downloaded to persistent storage 608 through communications unit 610.

I/O interface(s) 612 allows for input and output of data with other devices that may be connected to each computer system. For example, I/O interface 612 may provide a connection to external devices 618 such as a keyboard, keypad, a touch screen and/or some other suitable input device. External devices 618 can also include portable computer readable storage media such as, for example, thumb drives, portable optical or magnetic disks and memory cards. Software and data used to practice embodiments of the present invention can be stored on such portable computer readable storage media and can be loaded onto persistent storage 608 via I/O interface(s) 612. I/O interface(s) 612 also connect to display 620.

Display 620 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience and thus the invention should not be limited to use solely in any specific application identified and/or implied by such nomenclature.

The present invention may be a system, a method and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable) or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data or either source code or object code written in any combination of one or more programming languages, including an object oriented programming language such as Smalltalk, C++ or the like and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN) or the connection may be made to an external computer (for example, through the Internet using an Internet Service Provider). In some embodiments, electronic circuitry including, for example, programmable logic circuitry, field-programmable gate arrays (FPGA) or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems) and computer program products according to embodiments of the invention. It will be understood that each block of the flowchart illustrations and/or block diagrams and combinations of blocks in the flowchart illustrations and/or block diagrams, can be implemented by computer readable program instructions.

These computer readable program instructions may be provided to a processor of a general purpose computer, special purpose computer or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus or other device to cause a series of operational steps to be performed on the computer, other programmable apparatus or other device to produce a computer implemented process, such that the instructions which execute on the computer, other programmable apparatus or other device implement the functions/acts specified in the flowchart and/or block diagram block or blocks.

The flowchart and block diagrams in the figures illustrate the architecture, functionality and operation of possible implementations of systems, methods and computer program products according to various embodiments of the present invention. In this regard, each block in the flowchart or block diagrams may represent a module, segment or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently or the blocks may sometimes be executed in the reverse order, depending upon the functionality involved. It will also be noted that each block of the block diagrams and/or flowchart illustration and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace or to enable others of ordinary skill in the art to understand the embodiments disclosed herein.

What is claimed is:

1. A method for providing simulated remote services locally to an integrated development environment (IDE), the method comprising:
   collecting, by one or more local virtual access modules, one or more remote services for local virtual service access;
   collecting, by the one or more local virtual access modules, one or more service information associated with the one or more remote services;
   creating, by the one or more local virtual access modules, one or more local service packages;
   creating, by the one or more local virtual access modules, a network tunnel on one or more firewalls wherein the one or more remote services are accessible by the one or more local service packages, respectively;
   creating, by the one or more local virtual access modules, one or more local environment variables wherein the one or more local environment variables are configured to provide the local virtual service access;
   simulating, by the one or more local virtual access modules, the one or more remote services based on the local virtual service access; and
   accepting, by the one or more local virtual access modules, a connection from an IDE to test a cloud application wherein the IDE and the cloud application are executing locally.

2. The method of claim 1, wherein the one or more service information comprises at least one of operation logic, data and authentication logic associated with the one or more remote services.

3. The method of claim 1, further comprising:
   receiving, by the one or more local virtual access modules, at least one of one or more off-line mode settings and one or more on-line mode settings;
   storing, by the one or more local virtual access modules, one or more off-line service transactions based on the one or more off-line mode settings;
   determining, by the one or more local virtual access modules, an on-line mode transition wherein least one of one or more off-line mode settings transitions toward one or more on-line mode settings; and
   responsive, by the one or more local virtual access modules, to the on-line mode transition by synchronizing the one or more remote services based on the one or more off-line service transactions.

4. The method of claim 3, wherein synchronizing the one or more remote services is based on receiving one or more events to proceed.

5. The method of claim 1, wherein the one or more remote services are services in a cloud environment.

6. The method of claim 1, wherein collecting, by the one or more local virtual access modules, one or more remote services is based on at least one of one or more user selections, one or more predetermined lists and automated collection of services usage associated with one or more applications.

7. The method of claim 1, wherein simulating, by the one or more local virtual access modules, the one or more remote service is based on operating at least one of an application and an IDE associated to the one or more local service packages.

8. A computer program product for providing simulated remote services locally to an integrated development environment (IDE), the computer program product comprising:
one or more non-transitory computer readable storage media and program instructions stored on the one or more non-transitory computer readable storage media, the program instructions comprising:
program instructions to, collect, by one or more local virtual access modules, one or more remote services for local virtual service access;
program instructions to, collect, by the one or more local virtual access modules, one or more service information associated with the one or more remote services;
program instructions to, create, by the one or more local virtual access modules, one or more local service packages;
program instructions to, create, by the one or more local virtual access modules, a network tunnel on one or more firewalls wherein the one or more remote services are accessible by the one or more local service packages, respectively;
program instructions to, create, by the one or more local virtual access modules, one or more local environment variables wherein the one or more local environment variables are configured to provide the local virtual service access;
program instructions to, simulate, by the one or more local virtual access modules, the one or more remote services based on the local virtual service access; and
accepting, by the one or more local virtual access modules, a connection from an IDE to test a cloud application wherein the IDE and the cloud application are executing locally.

9. The computer program product of claim 8, wherein the one or more service information comprises at least one of operation logic, data and authentication logic associated with the one or more remote services.

10. The computer program product of claim 8, further comprising:
program instructions to, receive, by the one or more local virtual access modules, at least one of one or more off-line mode settings and one or more on-line mode settings;
program instructions to, store, by the one or more local virtual access modules, one or more off-line service transactions based on the one or more off-line mode settings;
program instructions to, determine, by the one or more local virtual access modules, an on-line mode transition wherein least one of one or more off-line mode settings transitions toward one or more on-line mode settings; and
program instructions to, respond, by the one or more local virtual access modules, to the on-line mode transition by synchronizing the one or more remote services based on the one or more off-line service transactions.

11. The computer program product of claim 10, wherein synchronizing the one or more remote services is based on receiving one or more events to proceed.

12. The computer program product of claim 8, wherein the one or more remote services are services in a cloud environment.

13. The computer program product of claim 8, wherein collect, by the one or more local virtual access modules, one or more remote services is based on at least one of one or more user selections, one or more predetermined lists and automated collection of services usage associated with one or more applications.

14. The computer program product of claim 8, wherein simulate, by the one or more local virtual access modules, the one or more remote service is based on operating at least one of an application and an IDE associated to the one or more local service packages.

15. A computer system for providing simulated remote services locally to an integrated development environment (IDE), the computer system comprising:
one or more computer processors;
one or more computer readable storage media;
program instructions stored on the one or more computer readable storage media for execution by at least one of the one or more computer processors, the program instructions comprising:
program instructions to, collect, by one or more local virtual access modules, one or more remote services for local virtual service access;
program instructions to, collect, by the one or more local virtual access modules, one or more service information associated with the one or more remote services;
program instructions to, create, by the one or more local virtual access modules, one or more local service packages;
program instructions to, create, by the one or more local virtual access modules, a network tunnel on one or more firewalls wherein the one or more remote services are accessible by the one or more local service packages, respectively;
program instructions to, create, by the one or more local virtual access modules, one or more local environment variables wherein the one or more local environment variables are configured to provide the local virtual service access;
program instructions to, simulate, by the one or more local virtual access modules, the one or more remote services based on the local virtual service access; and
accepting, by the one or more local virtual access modules, a connection from an IDE to test a cloud application wherein the IDE and the cloud application are executing locally.

16. The computer system of claim 15, wherein the one or more service information comprises at least one of operation logic, data and authentication logic associated with the one or more remote services.

17. The computer system of claim 15, further comprising:
program instructions to, receive, by the one or more local virtual access modules, at least one of one or more off-line mode settings and one or more on-line mode settings;
program instructions to, store, by the one or more local virtual access modules, one or more off-line service transactions based on the one or more off-line mode settings;
program instructions to, determine, by the one or more local virtual access modules, an on-line mode transition wherein least one of one or more off-line mode settings transitions toward one or more on-line mode settings; and
program instructions to, respond, by the one or more local virtual access modules, to the on-line mode transition by synchronizing the one or more remote services based on the one or more off-line service transactions.

18. The computer system of claim 17, wherein synchronizing the one or more remote services is based on receiving one or more events to proceed.

19. The computer system of claim 15, wherein the one or more remote services are services in a cloud environment.

20. The computer system of claim 15, wherein collect, by the one or more local virtual access modules, one or more remote services is based on at least one of one or more user selections, one or more predetermined lists and automated collection of services usage associated with one or more applications.

\* \* \* \* \*